(12) United States Patent
Yamanaka

(10) Patent No.: US 9,098,768 B2
(45) Date of Patent: Aug. 4, 2015

(54) CHARACTER DETECTION APPARATUS, CHARACTER DETECTION METHOD, AND COMPUTER-READABLE STORAGE MEDIUM

(75) Inventor: Tomoo Yamanaka, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 590 days.

(21) Appl. No.: 13/393,768

(22) PCT Filed: Jan. 4, 2012

(86) PCT No.: PCT/JP2012/000007
§ 371 (c)(1),
(2), (4) Date: Mar. 1, 2012

(87) PCT Pub. No.: WO2012/091180
PCT Pub. Date: Jul. 5, 2012

(65) Prior Publication Data
US 2012/0201461 A1  Aug. 9, 2012

(30) Foreign Application Priority Data

Dec. 29, 2010  (JP) ................................. 2010-294504

(51) Int. Cl.
| | | |
|---|---|---|
| *G06K 9/34* | (2006.01) | |
| *G06K 9/32* | (2006.01) | |
| *G06K 9/44* | (2006.01) | |
| *G06K 9/46* | (2006.01) | |

(52) U.S. Cl.
CPC ................ *G06K 9/3233* (2013.01); *G06K 9/44* (2013.01); *G06K 9/4642* (2013.01); *G06K 9/346* (2013.01)

(58) Field of Classification Search
None
See application file for complete search history.

(56) References Cited

U.S. PATENT DOCUMENTS

| | | | |
|---|---|---|---|
| 5,594,809 A * | 1/1997 | Kopec et al. .................. | 382/161 |
| 2005/0069207 A1* | 3/2005 | Zakrzewski et al. .......... | 382/190 |
| 2005/0100212 A1* | 5/2005 | Eguchi et al. ................. | 382/164 |
| 2010/0074526 A1 | 3/2010 | Campbell | |
| 2011/0019911 A1* | 1/2011 | Yamazaki ..................... | 382/164 |
| 2012/0188360 A1* | 7/2012 | Okamoto et al. .............. | 348/79 |

FOREIGN PATENT DOCUMENTS

| | | |
|---|---|---|
| JP | 63-131272 | 6/1988 |
| JP | 2002-369011 | 12/2002 |

(Continued)

OTHER PUBLICATIONS

Notification of Reason(s) for Refusal mailed Sep. 3, 2013, directed to Japanese Application No. 2010-294504; 6 pages.

(Continued)

*Primary Examiner* — Thomas Conway
(74) *Attorney, Agent, or Firm* — Buchanan Ingersoll & Rooney PC

(57) ABSTRACT

A character detection apparatus is provided that detects, from an image including a first image representing a character and a second image representing a translucent object, the character. The character detection apparatus includes a calculating portion that, for each of blocks obtained by dividing an overlapping region in which the first image is overlapped by the second image, calculates a frequency of appearance of pixels for each of gradations of a property, and a detection portion that detects the character from the overlapping region based on the frequency for each of the gradations.

12 Claims, 12 Drawing Sheets

(56) References Cited

FOREIGN PATENT DOCUMENTS

| JP | 2005-150855 | 6/2005 |
|----|-------------|--------|
| JP | 2010-4137   | 1/2010 |
| JP | 2010-81604  | 4/2010 |
| JP | 2011-29856  | 2/2011 |

OTHER PUBLICATIONS

International Preliminary Report on Patentability and Written Opinion dated Jul. 10, 2013, directed to International Application No. PCT/JP2012/000007; 8 pages.

International Search Report mailed Feb. 28, 2012, directed to International Application No. PCT/JP2012/000007; 5 pages.

* cited by examiner

FIG. 4
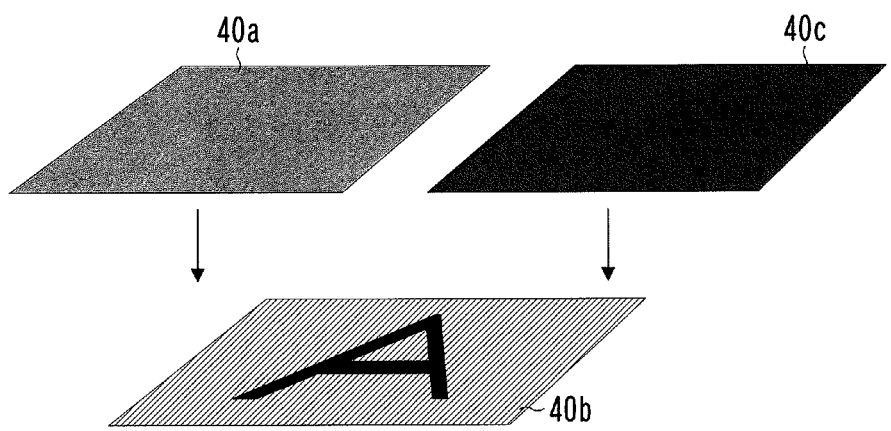
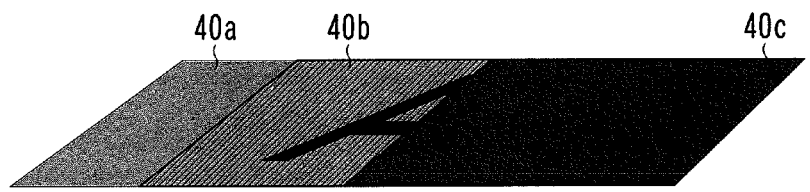

FIG. 7
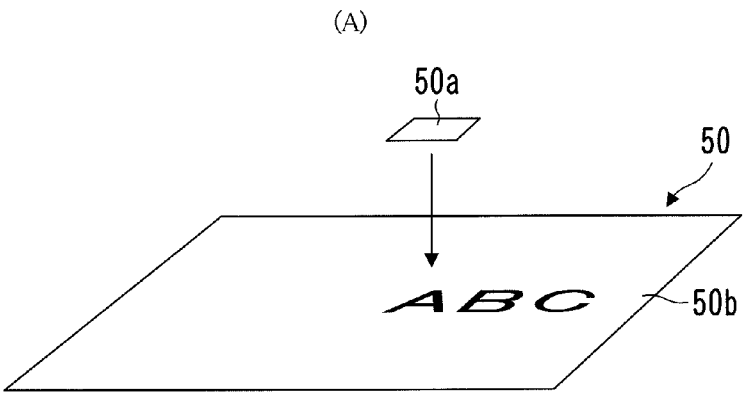
(A)
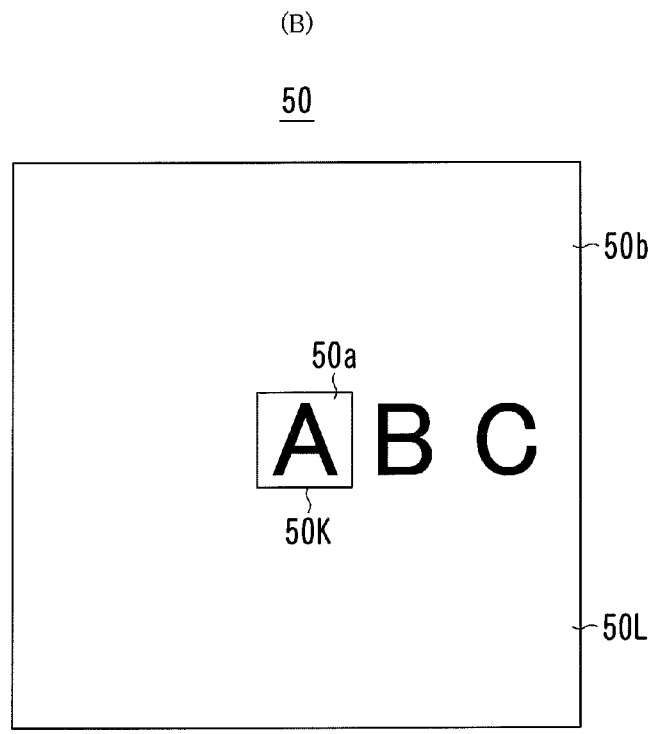
(B)

FIG. 8
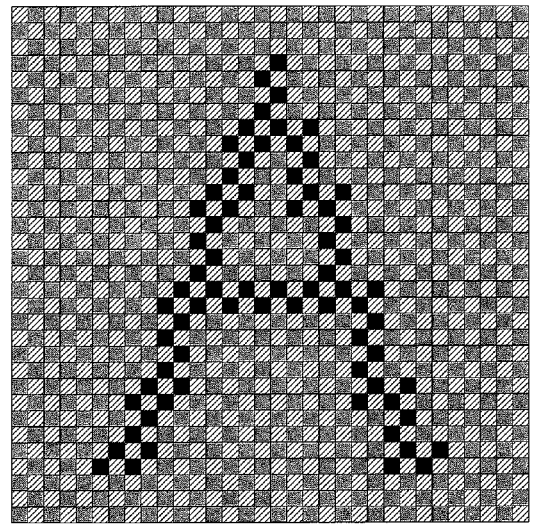
(A)
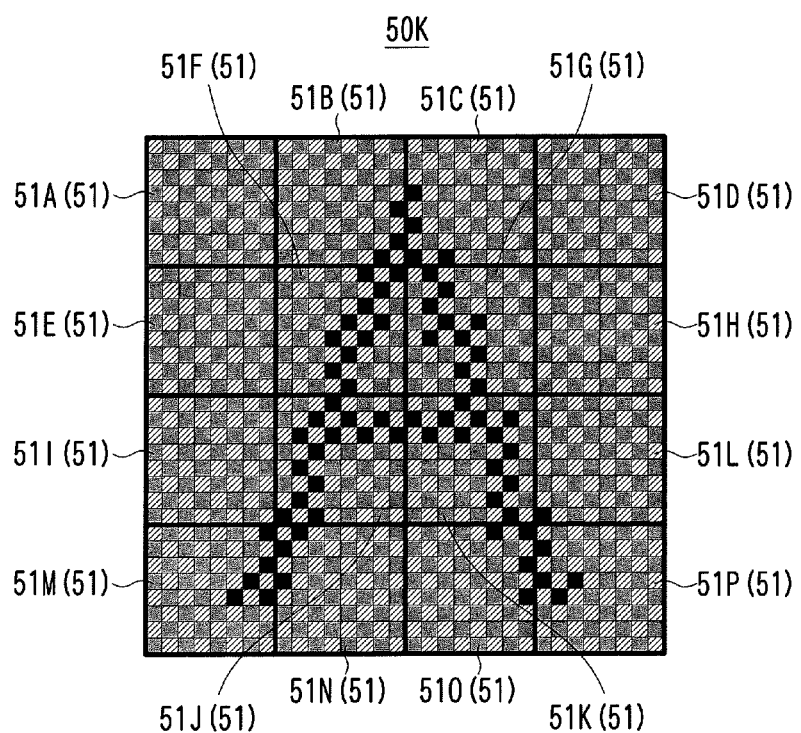
(B)

FIG. 9
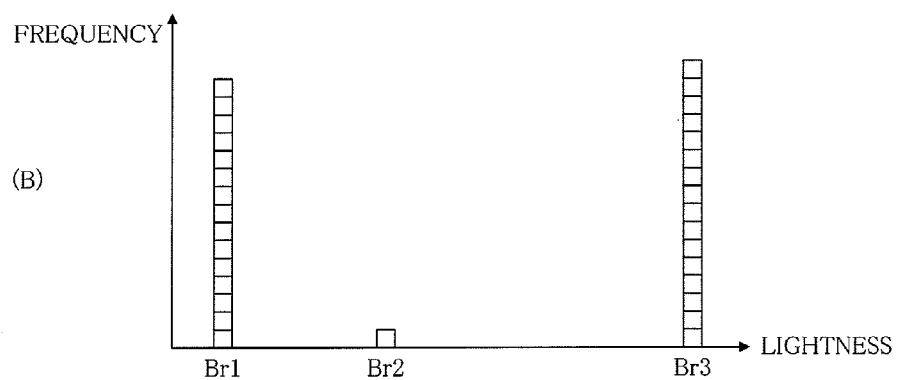
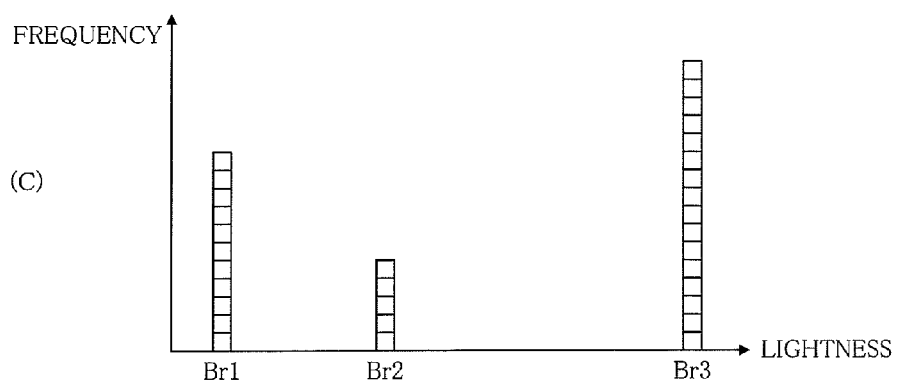

CHARACTER DETECTION APPARATUS, CHARACTER DETECTION METHOD, AND COMPUTER-READABLE STORAGE MEDIUM

TECHNICAL FIELD

The present invention relates to an apparatus, a method, and the like for performing image processing on an image that includes a transparent image.

BACKGROUND ART

This application is based on Japanese patent application No. 2010-294504 filed on Dec. 29, 2010, the contents of which are hereby incorporated by reference.

Recent years have seen the widespread use of image forming apparatuses that include various functions such as copying, PC printing, scanning, faxing, and serving as a file server. Such image forming apparatuses are called a "multifunction device" or an "MFP" (Multi-Functional Peripheral).

PC printing is a function for receiving image data from a personal computer and printing an image on a sheet.

Also, applications for performing rendering with a personal computer have been distributed in recent years.

Such applications are called "rendering software". Some rendering software includes a function for displaying a transparent image on a display.

A "transparent image" is characteristic in that an image of an object that is behind the transparent image can be seen through the transparent image.

Specifically, as shown in FIG. 4A for example, a transparent image 40a is overlaid on the left half of a background image 40b. As shown in FIG. 4B, the portion of the background image 40b that is overlapped by the transparent image 40a can be seen through the transparent image 40a. However, when a non-transparent image 40c, which is not a transparent image, is overlaid on the right half of the background image 40b, the background image 40b cannot be seen through the non-transparent image 40c. The higher the transparency of the transparent image is, the more visible the background image that is overlapped by the transparent image is.

A transparent image displayed by a personal computer can be printed on a sheet by an image forming apparatus. Before the transparent image is printed, pixel thinning-out processing is performed in accordance with the level of transparency as shown in FIGS. 5B and 5C. The image behind the transparent image is then printed in the positions of the pixels that were removed in the thinning-out processing. Accordingly, the background image can be seen through the transparent image.

Also, technology for detecting characters such as letters and numbers in an image has been put into practical use. Furthermore, methods for precisely detecting characters have also been proposed. For example, methods such as the following have been proposed.

A digital image is divided into multiple blocks, a contrast amount relating to the pixel values of the pixels included in a block is obtained for each block, a pixel value bimodality evaluation value relating to a histogram of the pixel values of the pixels included in a block is obtained for each block, a contrast threshold value is obtained based on the contrast amounts, a bimodality threshold value is obtained based on the pixel value bimodality evaluation values, and the blocks are classified as text blocks or non-text blocks. In this classifying, a block is classified into a text block if the contrast amount and the pixel value bimodality evaluation value thereof satisfy a first criterion that is based on the contrast threshold value and the bimodality threshold value, and a block is classified into a non-text block if the first criterion is not satisfied (Patent Literature 1).

CITATION LIST

Patent Literature 1: Japanese Laid-open Patent Publication No. 2010-081604

SUMMARY OF INVENTION

Technical Problem

However, with conventional methods such as that disclosed in Patent Literature 1, characters that are overlapped by a transparent image cannot be favorably detected. This is because the entirety of the portion that is overlapped by the transparent image is determined to be a text region.

The present invention has been achieved in light of such an issue, and an object thereof is to enable characters overlapped by a transparent image to be detected more precisely than in conventional technology.

Solution to Problem

A character detection apparatus according to an aspect of the present invention is a character detection apparatus that detects, from an image including a first image representing a character and a second image representing a translucent object, the character, the character detection apparatus includes a calculating portion that, for each of blocks obtained by dividing an overlapping region in which the first image is overlapped by the second image, calculates a frequency of appearance of pixels for each of gradations of a property; and a detection portion that detects the character from the overlapping region based on the frequency for each of the gradations.

Preferably, the character detection apparatus includes a generating portion that, in a case where a first frequency, a second frequency and a third frequency of the frequencies are peaks, the first frequency being a frequency for a first gradation of the gradations, the second frequency being a frequency for a second gradation of the gradations and the third frequency being a frequency for a third gradation of the gradations, and where a difference between the third frequencies of any two of the blocks is greater than a difference between the first frequencies of said two of the blocks and a difference between the second frequencies of said two the blocks, generates a first replacement image by replacing a third pixel having the third gradation of the overlapping region with a first pixel having the first gradation of the overlapping region, and generates a second replacement image by replacing the third pixel with a second pixel having the second gradation of the overlapping region; a first closing processing portion that performs closing on the second pixel in the first replacement image; and a second closing processing portion that performs closing on the first pixel in the second replacement image, wherein the detection portion detects, as the character, a set of pixels that are located at positions corresponding to positions of the first pixel in the closing processed first replacement image or at positions corresponding to positions of the second pixel in the closing processed second replacement image, from the overlapping region.

When the second image is a color image, the property is, for example, color lightness. When the first image and the second image are monochrome images, the property is, for example, density.

These and other characteristics and objects of the present invention will become more apparent by the following descriptions of preferred embodiments with reference to drawings.

BRIEF DESCRIPTION OF DRAWINGS

FIGS. 4A and 4B show diagrams illustrating an example of how a transparent image and a non-transparent image are overlaid on a background image.

FIGS. 7A and 7B show diagrams showing an example of a positional relationship between a transparent image overlapping region in which a transparent image is overlaid on a background image and a transparent image non-overlapping region.

FIGS. 8A and 8B show diagrams showing an example of pixels that constitute a transparent image overlapping region.

FIGS. 9A to 9C show histograms showing an example of the number (distribution) of pixels for each level of lightness.

DESCRIPTION OF EMBODIMENTS

Figure 1:
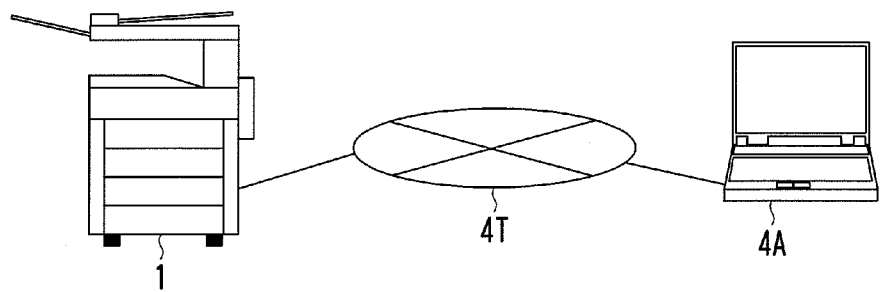
FIG. 1 is a diagram showing an example of a network system including an image forming apparatus.
Figure 2:
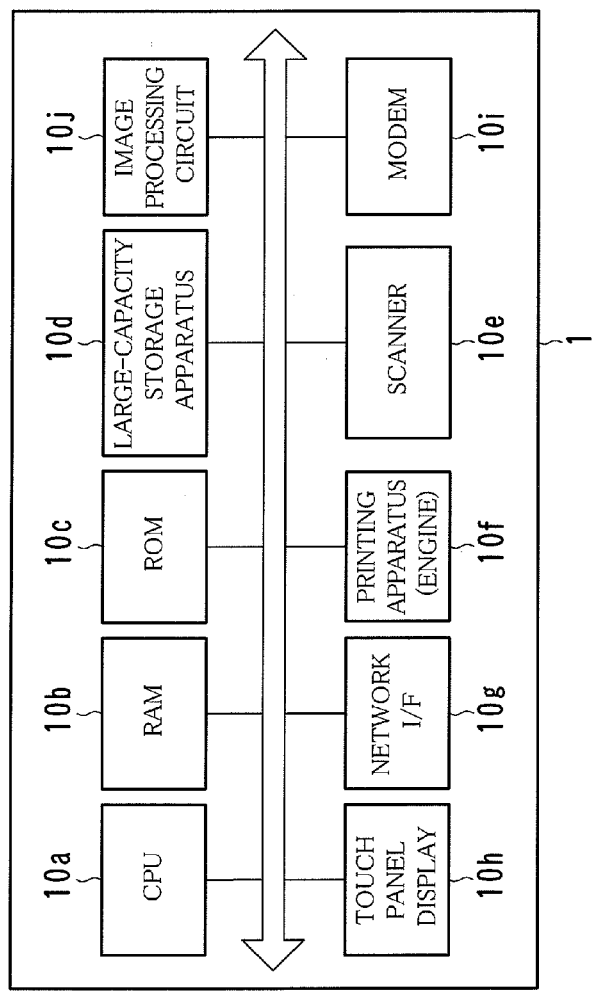
FIG. 2 is a diagram showing an example of a hardware configuration of an image forming apparatus.

FIG. 1 is a diagram showing an example of a network system including an image forming apparatus 1. FIG. 2 is a diagram showing an example of a hardware configuration of the image forming apparatus 1.

The image forming apparatus 1 shown in FIG. 1 is an apparatus that is generally called a multifunction device or an MFP (Multi-Functional Peripheral) and includes functions such as copying, networking printing (PC printing), faxing, and scanning.

The image forming apparatus 1 can exchange image data with an apparatus such as a personal computer 4A via a communication line 4T such as a LAN (Local Area Network), a public line, or the Internet.

As shown in FIG. 2, the image forming apparatus 1 is configured by a CPU (Central Processing Unit) 10a, a RAM (Random Access Memory) 10b, a ROM (Read Only Memory) 10c, a large-capacity storage apparatus 10d, a scanner 10e, a printing apparatus 10f, a network interface 10g, a touch panel display 10h, a modem 10i, an image processing circuit 10j, and the like.

The scanner 10e is an apparatus that reads an image such as photographs, characters, pictures, charts, and the like that are recorded on an original sheet, and generates image data.

The touch panel display 10h displays, for example, a screen for presenting messages and instructions to a user, a screen for allowing a user to input processing commands and conditions, and a screen showing the results of processing performed by the CPU 10a. The touch panel display 10h also detects a position touched by the user's finger, and transmits a signal indicating the detection result to the CPU 10a.

The network interface log is an NIC (Network Interface Card) for communicating with other apparatuses such as the personal computer 4A via the communication line 4T.

The modem 10i is an apparatus for exchanging image data using a protocol such as G3 with other fax terminals via a fixed telephone network.

The image processing circuit 10j performs image processing on an image to be printed based on image data transmitted from the personal computer 4A. Respective portions of the image processing circuit 10j are implemented by circuits such as an ASIC (Application Specific Integrated Circuit) and an FPGA (Field Programmable Gate Array). Processing performed by each portion of the image processing circuit 10j will be described later.

The printing apparatus 10f prints an image that has been read by the scanner 10e, an image that has been subjected to image processing by the image processing circuit 10j or the like on a sheet.

The ROM 10c and the large-capacity storage apparatus 10d store an OS (Operating System) and programs such as firmware and applications. The programs are loaded into the RAM 10b and executed by the CPU 10a as needed. The large-capacity storage apparatus 10d can be a hard disk drive, flash memory or the like.

Next, a configuration of the image processing circuit 10j and image processing performed by the image processing circuit 10j will be described.

Figure 3:
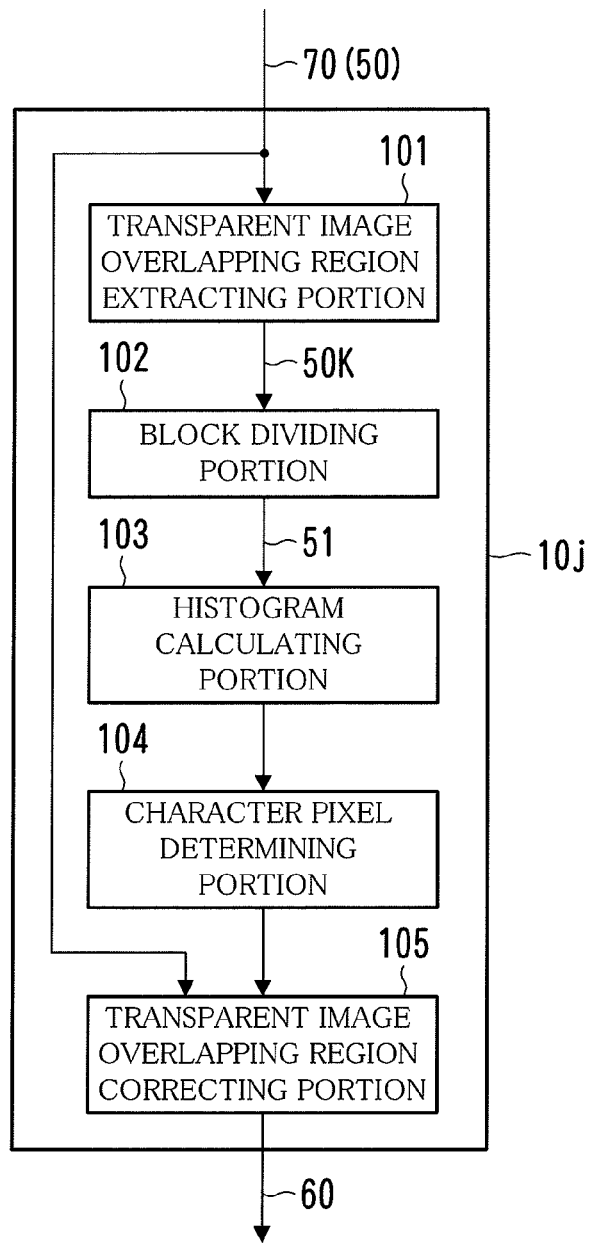
FIG. 3 is a diagram showing an example of a configuration of an image processing circuit.
Figure 5:
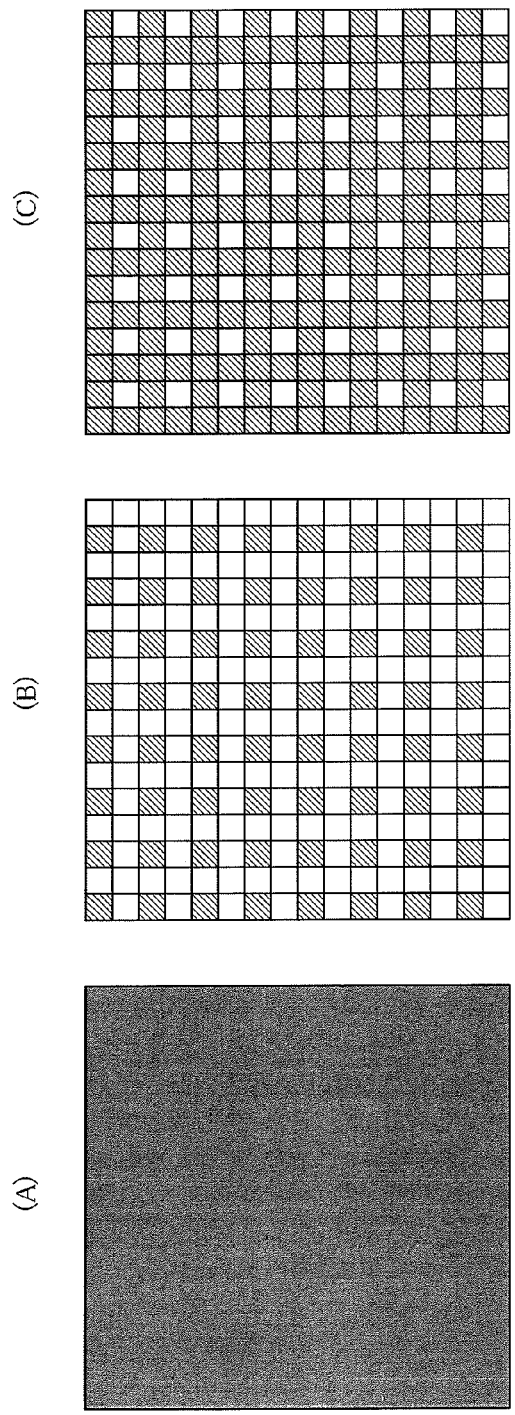
FIGS. 5A to 5C show diagrams illustrating examples of characteristics of transparent images.
Figure 6:
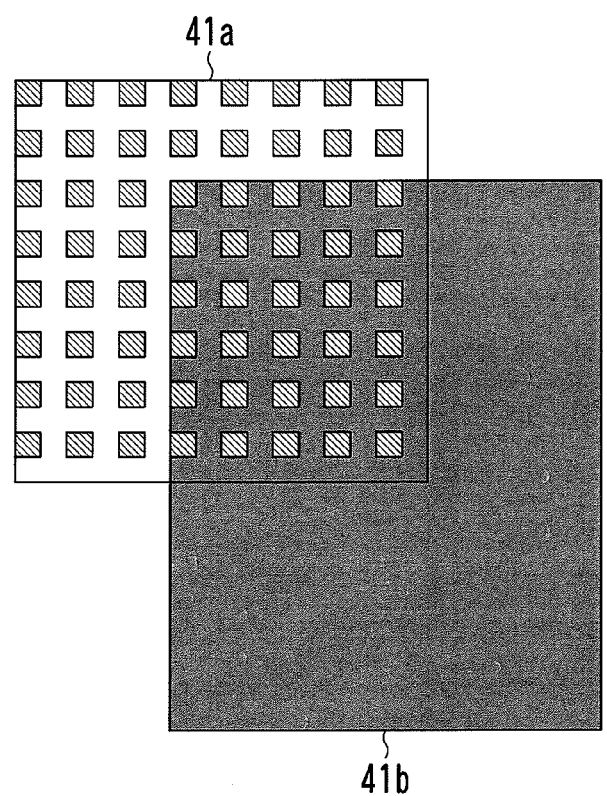
FIG. 6 is a diagram illustrating an example of how a transparent image is overlaid on a background image.
Figure 10:
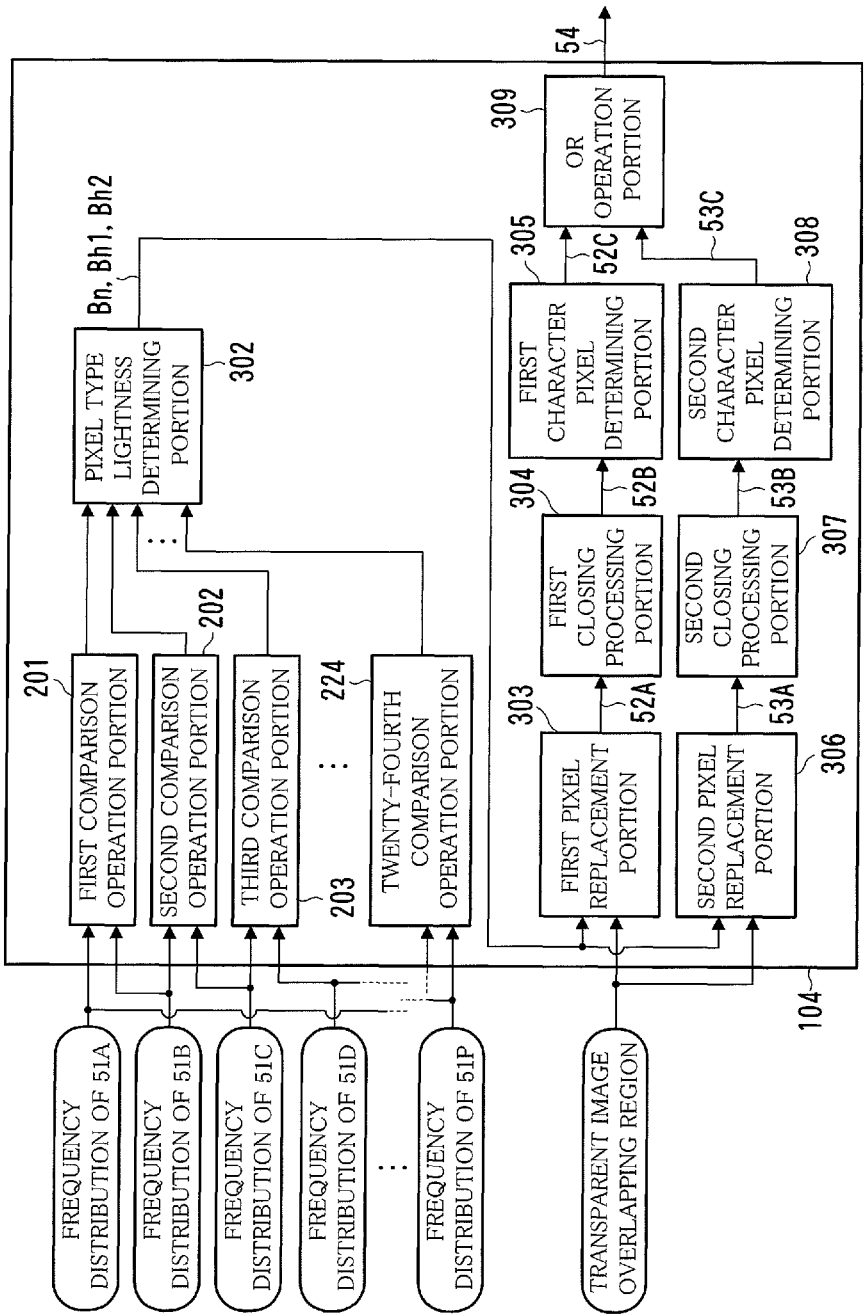
FIG. 10 is a diagram showing an example of a configuration of a character pixel determining portion.
Figure 11:
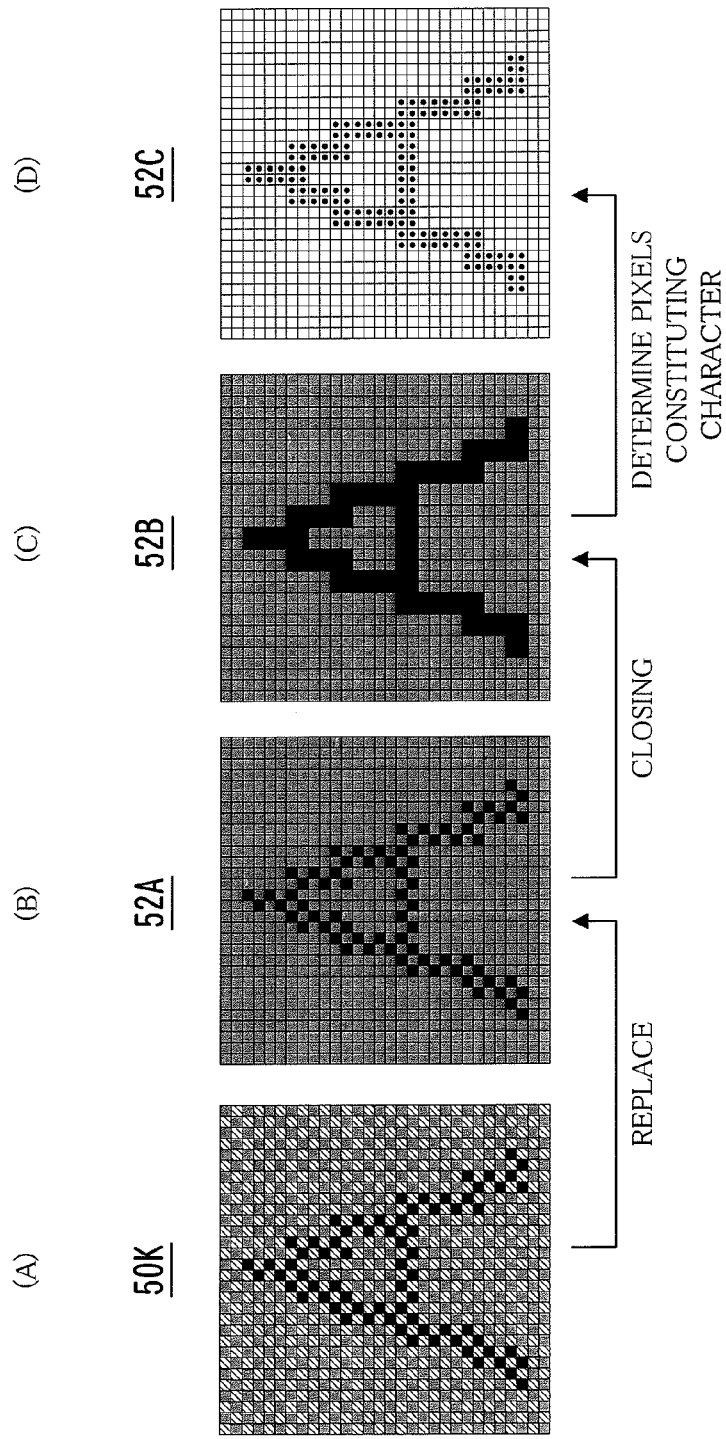
FIG. 11 shows diagrams illustrating an example of processing performed by a first pixel replacement portion, a first closing processing portion, and a first character pixel determining portion.
Figure 12:
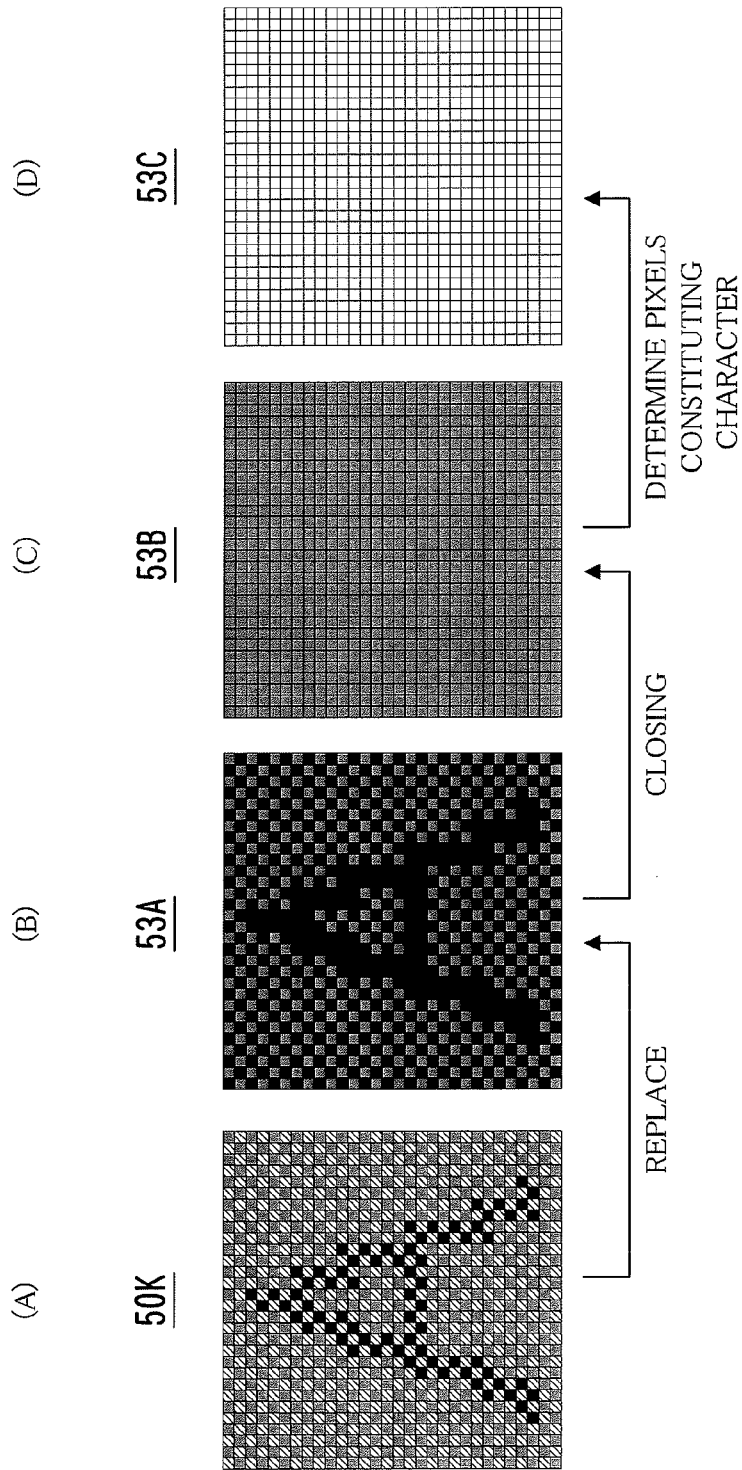
FIG. 12 shows diagrams illustrating an example of processing performed by a second pixel replacement portion, a second closing processing portion, and a second character pixel determining portion.
Figure 13:
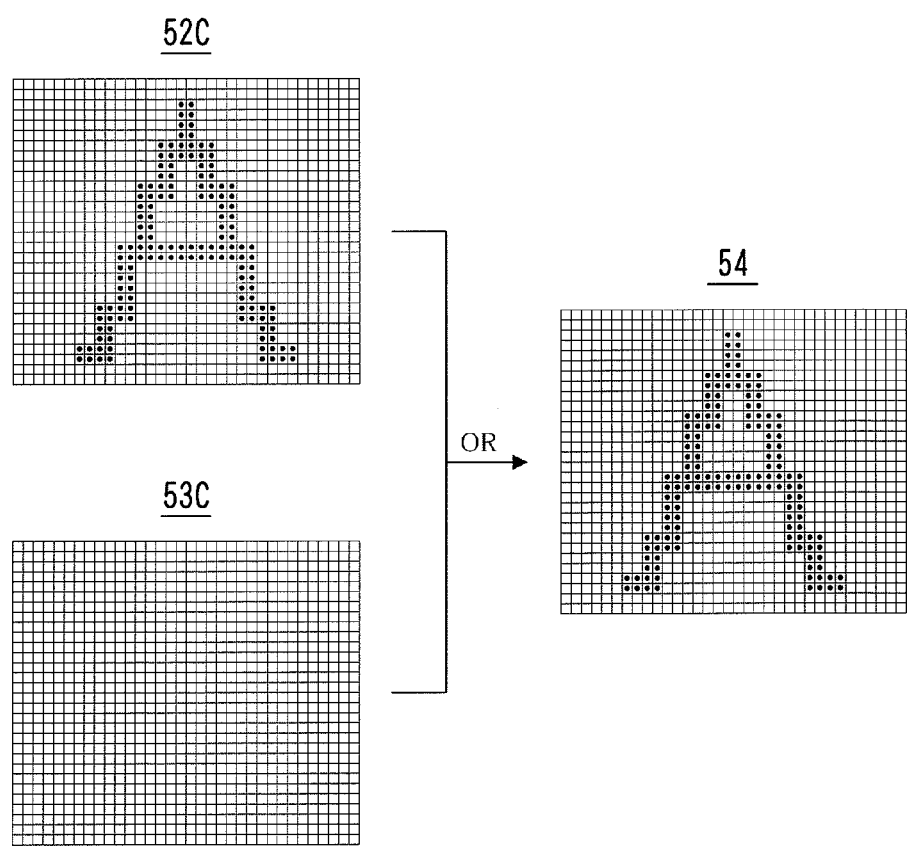
FIG. 13 is a diagram illustrating an example of processing performed by an OR operation portion.

FIG. 3 is a diagram showing an example of a configuration of the image processing circuit 10j. FIGS. 4A and 4B show diagrams illustrating an example of how a transparent image 40a and a non-transparent image 40c are overlaid on a background image 40b. FIGS. 5A to 5C show diagrams illustrating examples of characteristics of transparent images. FIG. 6 is a diagram illustrating an example of how a transparent image 41a is overlaid on a background image 41b. FIGS. 7A and 7B show diagrams showing an example of a positional relationship between a transparent image overlapping region 50K in which a transparent image 50a is overlaid on a background image 50b and a transparent image non-overlapping region 50L. FIGS. 8A and 8B show diagrams showing an example of pixels that constitute the transparent image overlapping region 50K. FIGS. 9A to 9C show histograms showing an example of the number (distribution) of pixels for each level of lightness. FIG. 10 is a diagram showing an example of a configuration of a character pixel determining portion 104. FIG. 11 shows diagrams illustrating an example of processing performed by a first pixel replacement portion 303, a first closing processing portion 304 and a first character pixel determining portion 305. FIG. 12 shows diagrams illustrating an example of processing performed by a second pixel replacement portion 306, a second closing processing portion 307 and a second character pixel determining portion 308. FIG. 13 is a diagram illustrating an example of processing performed by an OR operation portion 309.

As shown in FIG. 3, the image processing circuit 10j is configured by a transparent image overlapping region extracting portion 101, a block dividing portion 102, a histogram calculating portion 103, a character pixel determining portion 104, a transparent image overlapping region correcting portion 105, and the like.

The image processing circuit 10j performs image processing on an image to be printed. Specifically, the image processing is information processing for editing image data 70 representing an image to be printed.

In the present embodiment, the image data 70 is image data representing an image in which a transparent image is overlaid on another image.

Generally, "transparent image" refers to an image through which an image of an object that is behind the image can be seen. In other words, it can be said that the transparent image represents a translucent object such as glass or cellophane. An example of the transparent image is a transparent GIF (Graphics Interchange Format) image.

For example, as shown in FIG. 4A, a transparent image 40a is overlaid on the left half of a background image 40b, and a non-transparent image 40c is overlaid on the right half of the background image 40b. As shown in FIG. 4B, the portion of the background image 40b that is overlapped by the transparent image 40a can be seen through the transparent image 40a. However, the portion of the background image 40b that is overlapped by the non-transparent image 40c cannot be seen through the non-transparent image 40c.

The higher the transparency of a transparent image is, the more visible another image (or in other words, background image) that is overlapped by the transparent image is.

Also, generally, when a transparent image is displayed by the personal computer 4A or the like, all pixels have a uniform density as shown in FIG. 5A, but when the transparent image is printed, as shown in FIG. 5B or 5C, the pixels are converted to pixels having a uniform density and pixels having a non-uniform density.

In FIGS. 5B and 5C, hatched pixels are pixels having a uniform density, and unhatched pixels are pixels having a non-uniform density. This applies to FIGS. 6, 8A, 8B, (A) to (C) of FIG. 11, and (A) to (C) of FIG. 12. Hereinafter, the pixels having a uniform density will be referred to as "density-present pixels", and the pixels having a non-uniform density will be referred to as "density-absent pixels". Also, "density" refers to the gradation of colors (for example, red, green, blue and so on) in the case where the transparent image is a color image, or the grayscale in the case where the transparent image is a monochrome image.

The density-present pixels are printed at a predetermined density. The density-absent pixels are not printed if there is not another image behind these pixels, but if there is another image, pixels in the other image that are located in the corresponding positions of the density-absent pixels are printed.

Accordingly, as show in FIG. 6, for example, in the case where a part of a transparent image 41a is overlaid on a part of a background image 41b, pixels of the background image 41b disposed at the corresponding positions of density-absent pixels of the transparent image 41a are printed, whereby the transparent image 41a and the background image 41b are printed such that the background image 41b appears to be visible through the transparent image 41a.

Also, the higher the level of transparency of a transparent image, the lower the frequency of appearance of density-present pixels becomes. Accordingly, the transparent image shown in FIG. 5B has a higher level of transparency than the transparent image shown in FIG. 5C.

In FIG. 5B, density-absent pixels are present on the upper, lower, left and right sides of each density-present pixel. On the other hand, in FIG. 5C, density-present pixels are present on the upper, lower, left and right sides of each density-absent pixel.

Hereinafter, a pixel surrounded by pixels of another type will be referred to as an "isolated point". Accordingly, in FIG. 5B, density-present pixels are isolated point pixels, and in FIG. 5C, density-absent pixels are isolated point pixels.

In the present embodiment, image processing performed by the image processing circuit 10j will be described using, for example, image data representing an original image 50 as the image data 70.

As shown in FIG. 7A, the original image 50 is an image in which a transparent image 50a is overlaid on a background image 50b. The user creates the original image 50 by using an application, such as rendering software, that has been installed on the personal computer 4A. Data for reproducing the original image 50 is generated as the image data 70.

Here, the transparent image 50a is smaller than the background image 50b. Accordingly, as shown in FIG. 7B, the original image 50 includes a region in which the background image 50b and the transparent image 50a overlap each other and a region consisting only of the background image 50b. Hereinafter, the former will be referred to as the "transparent image overlapping region 50K" and the latter will be referred to as the "transparent image non-overlapping region 50L". A character "A" is shown in the portion of the background image 50b that is overlapped by the transparent image 50a. The color of the character can be a specific color such as blue. The color of the background of the character can be another specific color such as yellow.

The personal computer 4A transmits the image data 70 to the image forming apparatus 1 together with a print instruction.

In the image forming apparatus 1, upon receiving the print instruction and the image data 70, the respective portions of the image processing circuit 10j execute processing such as follows.

The transparent image overlapping region extracting portion 101 distinguishes and extracts the transparent image overlapping region 50K from the original image 50.

Specifically, the transparent image overlapping region extracting portion 101 determines and detects the transparent image overlapping region 50K as follows based on the above-described characteristics of transparent images, for example.

The transparent image overlapping region extracting portion 101 detects isolated points from among the original image 50 in the following manner. Attention is focused on one pixel. This pixel will be hereinafter referred to as a "pixel of interest". The density (gradation) of the pixel of interest is compared with the density of each of pixels (hereinafter referred to as "neighboring pixels") present on the upper, lower, left and right sides of the pixel of interest.

If a requirement that the difference between the density of the pixel of interest and the density of one of the neighboring pixels is a predetermined value β or greater is satisfied for each of the neighboring pixels, the transparent image overlapping region extracting portion 101 detects the pixel of interest as an isolated point.

In the case where the original image 50 is a color image, the transparent image overlapping region extracting portion 101 performs the above comparison for each color. If any one of the colors satisfies the requirement, the pixel of interest is detected as an isolated point. Hereinafter, this applies to determining whether or not the requirement is satisfied in the case where the original image 50 is a color image.

As shown in FIGS. 5B and 5C, isolated points appear in a transparent image at a fixed periodicity (regularity). Thus, the transparent image overlapping region extracting portion 101 extracts isolated points that appear periodically from among the detected isolated points.

Then, the transparent image overlapping region extracting portion 101 performs closing processing on an image indicating the distribution of the extracted isolated points (hereinafter referred to as a "distribution image"). Specifically, processing for enlarging (expanding)/reducing (contracting) the dot located at the position of each isolated point is performed. The position and shape of the distribution image that has undergone closing processing substantially correspond to the position and shape of the transparent image overlapping region 50K.

The transparent image overlapping region extracting portion 101 identifies the position and shape of the transparent image overlapping region 50K in the manner described above, and extracts the transparent image overlapping region 50K from the original image 50.

In the case where the transparent image has a transparency level of around 50%, density-present pixels are detected as isolated points, and the pixels of the background image that are at the positions of density-absent pixels are also detected as isolated points. In other words, most of the pixels in the region are detected as isolated points. The density of each density-present pixel is uniform, but the density of the pixels of the background image that are in the positions of density-absent pixels is not uniform. Accordingly, in the case where most of the pixels in the region have been detected as isolated points, the transparent image overlapping region extracting portion 101 selects only isolated points having a uniform density, and performs closing using an image indicating the distribution of the selected isolated points as a distribution image.

The block dividing portion 102 divides the transparent image overlapping region 50K extracted by the transparent image overlapping region extracting portion 101 into a predetermined number of blocks 51. In the present embodiment, the transparent image overlapping region 50K shown in FIG. 8A is divided into 4×4 blocks 51A to 51P as shown in FIG. 8B. The blocks 51A to 51P are assumed to have the same size.

In FIGS. 8A and 8B, hatched pixels are density-present pixels of the transparent image 50a. Both black pixels and gray pixels are pixels of the background image 50b that are in the positions of density-absent pixels of the transparent image 50a. The black pixels are pixels constituting a character "A" and the gray pixels are pixels constituting the background of the character.

The histogram calculating portion 103 calculates a frequency distribution for each of the blocks 51A to 51P, the frequency distribution using the number of pixels for each level of lightness as the frequency. The calculated frequency distribution of each block can be represented as a histogram as shown in FIGS. 9A to 9C.

The histograms shown in FIGS. 9A, 9B and 9C are histograms that represent the frequency distributions of block 51A, block 51B and block 51C, respectively.

In the three histograms, two or three peaks can be observed. Each peak corresponds to any one of the number (distribution) of pixels having the same level of lightness as the density-present pixels of the transparent image 50a, the number (distribution) of pixels having the same level of lightness as the character in the background image 50b, and the number (distribution) of pixels having the same level of lightness as the background of the character in the background image 50b.

As shown in FIG. 10, the character pixel determining portion 104 is configured by twenty four comparison operation portions, a pixel type lightness determining portion 302, a first pixel replacement portion 303, a first closing processing portion 304, a first character pixel determining portion 305, a second pixel replacement portion 306, a second closing processing portion 307, a second character pixel determining portion 308, an OR operation portion 309 and the like. With this configuration, the character pixel determining portion 104 distinguishes the pixels constituting the character from the pixels of the transparent image overlapping region 50K based on the frequency distributions of the blocks 51 calculated by the histogram calculating portion 103 in the manner as described below. Hereinafter, the twenty-four comparison operation portions will also be referred to as the "first comparison operation portion 201", the "second comparison operation portion 202" . . . , and the "twenty-fourth comparison operation portion 224" where it is necessary to make a distinction.

For the transparent image overlapping region 50K, there are twenty four possible combinations of two vertically and horizontally adjacent blocks 51. In the character pixel determining portion 104, one comparison operation portion is provided for each combination. The comparison operation portion compares the frequency distributions of blocks 51 calculated by the histogram calculating portion 103.

For example, the first comparison operation portion 201 compares the frequency distribution of block 51A and the frequency distribution of block 51B. The second comparison operation portion 202 compares the frequency distribution of block 51B and the frequency distribution of block 51C. The third comparison operation portion 203 compares the frequency distribution of block 51C and the frequency distribution of block 51D.

Each comparison operation portion compares the frequency distributions of blocks 51 in the manner as follows. As described with reference to FIGS. 9A to 9C, in the frequency distributions of the blocks 51, there are two or three peaks. The comparison operation portion compares the peaks that are on the same level of lightness of two blocks 51.

For example, the first comparison operation portion 201 makes a comparison between the frequency of first lightness level Br1 of the block 51A and the frequency of the first lightness level Br1 of the block 51B, between the frequency of second lightness level Br2 of the block 51A and the frequency of the second lightness level Br2 of the block 51B, and between the frequency of third lightness level Br3 of the block 51A and the frequency of the third lightness level Br3 of the block 51B.

Similarly, the second comparison operation portion 202 makes a comparison between the frequency of the first lightness level Br1 of the block 51B and the frequency of the first lightness level Br1 of the block 51C, between the frequency of the second lightness level Br2 of the block 51B and the frequency of the second lightness level Br2 of the block 51C, and between the frequency of the third lightness level Br3 of the block 51B and the frequency of the third lightness level Br3 of the block 51C.

Then, each comparison operation portion notifies the pixel type lightness determining portion 302 of a lightness level having a difference between two frequencies of less than a predetermined value α as a uniform lightness level and a lightness level having a difference between two frequencies of greater than or equal to the predetermined value α as a non-uniform lightness level.

For example, the frequency distribution of the block 51A is as shown in the histogram of FIG. 9A, and the frequency distribution of the block 51B is as shown in the histogram of FIG. 9B. Comparing these two indicates that the block 51A and the block 51B have the same frequency of pixels at the lightness level Br3, but have different frequencies of pixels at the lightness level Br1 and the lightness level Br2.

Accordingly, the first comparison operation portion 201 notifies the pixel type lightness determining portion 302 of the lightness level Br3 as a uniform lightness level. Also, the first comparison operation portion 201 notifies the pixel type lightness determining portion 302 of the lightness level Br1 and the lightness level Br2 as a uniform lightness level or a non-uniform lightness level depending on the predetermined value α. For example, if the predetermined value α is "1", which can be satisfied when there is even a slight difference between two frequencies, the lightness level Br1 and the lightness level Br2 will be determined as a non-uniform lightness level. Thus, the lightness level Br1 and the lightness level Br2 are notified as a non-uniform lightness level.

The pixel type lightness determining portion 302 obtains, from the twenty four comparison operation portions, approximately twenty four uniform lightness levels and approximately forty eight non-uniform lightness levels in total.

As described above, all of the density-present pixels of the transparent image 50a have the same color, all of the pixels constituting the character in the background image 50b have the same color, and all of the pixels constituting the background of the character in the background image 50b have the same color. Accordingly, the uniform lightness levels and the non-uniform lightness levels will correspond to any one of the first lightness level Br1, the second lightness level Br2 and the third lightness level Br3.

The pixel type lightness determining portion 302 classifies the approximately twenty four uniform lightness levels, which have been notified, according to the value. In this example, the uniform lightness levels are classified into any one of the first lightness level Br1, the second lightness level Br2 and the third lightness level Br3. Then, the one into which the greatest number of uniform lightness levels have been classified is determined as the lightness of the density-present pixels of the transparent image 50a. Consequently, in this example, the number of uniform lightness levels that have been classified into the third lightness level Br3 is the greatest, and therefore the third lightness level Br3 is determined as the lightness of the density-present pixels of the transparent image 50a. The distribution of lightness of the density-present pixels of the transparent image 50a is substantially uniform among the blocks 51. Hereinafter, the lightness level (uniform lightness level) that has been determined as the lightness level of the density-present pixels of the transparent image 50a will be referred to as the "density-present pixel lightness level Bn".

Furthermore, the pixel type lightness determining portion 302 also classifies the approximately forty eight non-uniform lightness levels, which have been notified, according to the value. In this example, the non-uniform lightness levels are classified into any one of the first lightness level Br1, the second lightness level Br2 and the third lightness level Br3. Then, the classified non-uniform lightness levels that are not the lightness of the density-present pixels of the transparent image 50a are determined as the lightness level of the pixels of the background image 50b. In this example, the third lightness level Br3 has been determined as the lightness of the density-present pixels of the transparent image 50a, and therefore the first lightness level Br1 and the second lightness level Br2 are determined as the lightness of the pixels of the background image 50b. Hereinafter, the two lightness levels (non-uniform lightness levels) that have been determined as the lightness of the pixels of the background image 50b will be referred to as the "first background image lightness level Bh1" and the "second background image lightness level Bh2". The following description provides an example in which the first lightness level Br1 is the first background image lightness level Bh1, and the second lightness level Br2 is the second background image lightness level Bh2.

Then, the pixel type lightness determining portion 302 notifies the first pixel replacement portion 303 and the second pixel replacement portion 306 of the density-present pixel lightness level Bn, the first background image lightness level Bh1 and the second background image lightness level Bh2.

The first pixel replacement portion 303, the first closing processing portion 304 and the first character pixel determining portion 305 perform processing based on the image data 70, the density-present pixel lightness level Bn, the first background image lightness level Bh1 and the second background image lightness level Bh2. A procedure of the processing will be described with reference to FIG. 11.

The first pixel replacement portion 303 searches the original image 50 for pixels that belong to the transparent image overlapping region 50K and that have the density-present pixel lightness level Bn. As a result, the hatched pixels in (A) of FIG. 11 are obtained. Then, the first pixel replacement portion 303 replaces the pixels having the density-present pixel lightness level Bn with the pixels (gray pixels) having the first background image lightness level Bh1 as shown in (B) of FIG. 11. Hereinafter, the image of the transparent image overlapping region 50K that has undergone replacement processing performed by the first pixel replacement portion 303 will be referred to as a "replacement processed image 52A".

The first closing processing portion 304 performs closing processing on the replacement processed image 52A by expanding and contracting the pixels (black pixels) having the second background image lightness level Bh2. As a result, a resultant image as shown in (C) of FIG. 11 is obtained. Hereinafter, the replacement processed image 52A that has undergone closing processing performed by the first closing processing portion 304 will be referred to as a "closing processed image 52B".

The lightness level of the pixels constituting the closing processed image 52B is one of the first background image lightness level Bh1 and the second background image lightness level Bh2.

The first character pixel determining portion 305 determines either of the pixels of the first background image lightness level Bh1 and the pixels of the second background image lightness level Bh2 that is smaller in number as pixels constituting the character. Then, the first character pixel determining portion 305 binarizes the closing processed image 52B such that the pixels determined as pixels constituting the character have a value of "1" and the other pixels have a value of "0". As a result, a resultant image as shown in (D) of FIG. 11 is obtained. In (D) of FIG. 11, the pixels with a black dot have a value of "1" and the pixels without a black dot have a value of "0". This applies to (D) of FIG. 12 and FIG. 13 described later. Hereinafter, the closing processed image 52B that has been binarized by the first character pixel determining portion 305 will be referred to as a "first binary image 52C".

The second pixel replacement portion 306, the second closing processing portion 307 and the second character pixel determining portion 308 also perform processing based on the image data 70, the density-present pixel lightness level Bn, the first background image lightness level Bh1 and the second background image lightness level Bh2, as with the first pixel replacement portion 303, the first closing processing portion 304 and the first character pixel determining portion 305. However, the use of the first background image lightness level Bh1 and the second background image lightness level Bh2 is different.

Processing performed by the second pixel replacement portion 306, the second closing processing portion 307 and the second character pixel determining portion 308 will be described with reference to FIG. 12.

The second pixel replacement portion 306 searches the original image 50 for pixels that belong to the transparent image overlapping region 50K and that have the density-present pixel lightness level Bn, and replaces the obtained pixels with pixels (black pixels) that have the second background image lightness level Bh2 as shown in (B) of FIG. 12. Hereinafter, the image of the transparent image overlapping region 50K that has undergone replacement processing performed by the second pixel replacement portion 306 will be referred to as a "replacement processed image 53A".

The second closing processing portion 307 performs closing processing on the replacement processed image 53A by expanding and contracting the pixels (gray pixels) having the first background image lightness level Bh1. As a result, a resultant image as shown in (C) of FIG. 12 is obtained. Hereinafter, the replacement processed image 53A that has undergone closing processing performed by the second closing processing portion 307 will be referred to as a "closing processed image 53B".

The lightness level of the pixels constituting the replacement processed image 53A is also one of the first background image lightness level Bh1 and the second background image lightness level Bh2, as with the lightness level of the pixels constituting the closing processed image 52B.

The second character pixel determining portion 308 determines either of the pixels of the first background image lightness level Bh1 and the pixels of the second background image lightness level Bh2 that is smaller in number as pixels constituting the character. Then, the second character pixel determining portion 308 binarizes the closing processed image 53B such that the pixels determined as pixels constituting the character have "1" and the other pixels have "0". As a result, a resultant image as shown in (D) of FIG. 12 is obtained. Hereinafter, the closing processed image 53B that has been binarized by the second character pixel determining portion 308 will be referred to as a "second binary image 53C".

The OR operation portion 309 calculates the logical OR of a pixel in the first binary image 52C and the pixel at the corresponding position in the second binary image 53C as shown in FIG. 13. A binary image 54 indicates the logical OR of each position.

The pixels having a value of "1" in the binary image 54 correspond to the pixels constituting the character in the transparent image overlapping region 50K.

As described above, the pixels constituting the character in the transparent image overlapping region 50K are determined through the processing performed by the constituent elements of the character pixel determining portion 104.

Reverting to FIG. 3, the transparent image overlapping region correcting portion 105 corrects the transparent image overlapping region 50K in the original image 50 based on the result determined by the character pixel determining portion 104 and the like. For example, the transparent image overlapping region correcting portion 105 performs edge enhancement processing on a pixel group that has been determined as the pixels constituting the character and blur processing on the remaining portion. Hereinafter, the original image 50 that has been processed by the transparent image overlapping region correcting portion 105 will be referred to as a "corrected image 60".

After that, the printing apparatus 10f prints the corrected image 60 on a sheet. Alternatively, the network interface log transmits the image data of the corrected image 60 to the personal computer 4A or the like.

According to the present embodiment, a character overlapped by a transparent image can be detected with greater accuracy than conventional technology.

In the present embodiment, the transparent image overlapping region 50K is detected based on the regularity of the positions of isolated points serving as density-present pixels, but in the case where the image data 70 already contains data indicating the position of the transparent image 50a, the transparent image overlapping region 50K may be detected based on the data.

In the present embodiment, the transparent image overlapping region 50K is divided into sixteen blocks 51, but the number of blocks 51 may be less than sixteen or may be seventeen or greater.

In the present embodiment, the frequency distributions of vertically and horizontally adjacent blocks 51 are compared, but any other combinations may be compared. For example, the frequency distributions of diagonally adjacent blocks 51 may be compared. Alternatively, the frequency distributions of only vertically adjacent blocks 51 may be compared, or the frequency distributions of only horizontally adjacent blocks 51 may be compared.

In the present embodiment, the transparent image overlapping region 50K is divided into a plurality of blocks 51 of equal size, but it may be divided into a plurality of blocks 51 of different sizes. In this case, it is desirable that the histogram calculating portion 103 of FIG. 3 calculates, instead of the number of pixels, the percentage of pixels in the entire block 51 as the frequency of pixels at each lightness level.

In the present embodiment, as described with reference to (A) of FIG. 11 to FIG. 13, the pixels constituting the character is determined by performing closing processing and logical OR operation.

As described above, the lightness level of the density-present pixels of the transparent image 50a can be identified first from among three lightness level peaks. In the example shown in FIGS. 9A to 9C, the third lightness level Br3 is the lightness level of the density-present pixels of the transparent image 50a.

Accordingly, one of the remaining two lightness level peaks (the first lightness level Br1 and the second lightness level Br2) corresponds to the pixels constituting the character and the other one corresponds to the pixels constituting the background of the character.

It is also possible to determine which of two lightness levels corresponds to which of the objects by using a method other than the method described with reference to (A) of FIG. 11 to FIG. 13.

For example, the following method is possible. The total of the first lightness levels Br1 of the blocks 51A to 51P is calculated, and the total of the second lightness levels Br2 of the blocks 51A to 51P is calculated. Then, the lightness level having a lower total is determined as the lightness level of the character, and the lightness level having a higher total is determined as the lightness of the background of the character.

With this method, in the example shown in FIGS. 9A to 9C, the second lightness level Br2 is determined as the lightness of the character, and the first lightness level Br1 is determined as the lightness of the background of the character.

In the present embodiment, detection of the character from the transparent image overlapping region 50K is performed primarily by the image processing circuit 10j, but it may be performed by the CPU 10a executing a computer program. In this case, a computer program is prepared that includes a program module containing, as a main routine, the processing procedure performed by the transparent image overlapping region extracting portion 101, the block dividing portion 102, the histogram calculating portion 103, the character pixel determining portion 104 and the transparent image overlapping region correcting portion 105 shown in FIG. 3 and a program module containing, as a sub routine, the processing procedure performed by the twenty-four comparison operation portions, the pixel type lightness determining portion 302, the first pixel replacement portion 303, the first closing processing portion 304, the first character pixel determining portion 305, the second pixel replacement portion 306, the second closing processing portion 307, the second character pixel determining portion 308 and the OR operation portion 309 shown in FIG. 10. The computer program is stored in the ROM 10c or the large-capacity storage apparatus 10d and executed by the CPU 10a.

In the present embodiment, the histogram calculating portion 103 calculates the frequency distribution for each level of lightness, but it may calculate the frequency distribution for other properties. For example, it is possible to use hue or chroma instead of lightness. In the case where the original image 50 is a monochrome image, the frequency distribution for density may be calculated.

According to one embodiment of the present invention, a character overlapped by a transparent image can be detected with greater accuracy than conventional technology.

It is to be understood that the configurations of the image forming apparatus 1 and the constituent elements thereof, the content and order of the processing, the configuration of data, and the like can be appropriately modified without departing from the spirit of the present invention.

It is to be understood that the present invention is not limited to example embodiments illustrated in the drawings, since the invention is capable of other embodiments and of being practiced or carried out in various ways. Also it is to be understood that the phraseology or terminology employed herein is for the purpose of description and not of limitation.

The invention claimed is:

1. A character detection apparatus that detects the character, from an image in which a first image representing the character is overlapped by a second image representing a translucent object, the character detection apparatus comprising:
   a calculating portion that, for each of blocks obtained by dividing an overlapping region in which the first image is overlapped by the second image, calculates a frequency of appearance of pixels for each of gradations of a property;
   a generating portion that determines which gradation is the one corresponding to the second image based on the frequency for each of the gradations and generates a replacement image by replacing a pixel having the determined gradation with a pixel having the gradation of the character; and
   a detection portion that detects the character from the overlapping region based on the replacement image.

2. The character detection apparatus according to claim 1, comprising:
   a generating portion that, in a case where a first frequency, a second frequency and a third frequency of the frequencies are peaks, the first frequency being a frequency for a first gradation of the gradations, the second frequency being a frequency for a second gradation of the gradations and the third frequency being a frequency for a third gradation of the gradations, and where a difference between the third frequencies of any two of the blocks is smaller than a difference between the first frequencies of said two of the blocks and a difference between the second frequencies of said two the blocks, generates a first replacement image by replacing a third pixel having the third gradation of the overlapping region with a first pixel having the first gradation of the overlapping region, and generates a second replacement image by replacing the third pixel with a second pixel having the second gradation of the overlapping region;
   a first closing processing portion that performs closing on the second pixel in the first replacement image; and
   a second closing processing portion that performs closing on the first pixel in the second replacement image,
   wherein the detection portion detects, as the character, a set of pixels that are located at positions corresponding to positions of the first pixel in the closing processed first replacement image or at positions corresponding to positions of the second pixel in the closing processed second replacement image, from the overlapping region.

3. The character detection apparatus according to claim 1, wherein in a case where the second image is a color image, the property is color lightness.

4. The character detection apparatus according to claim 1, wherein in a case where the first image and the second image are monochrome images, the property is density.

5. A character detection method for detecting the character, from an image in which a first image representing the character is overlapped by a second image representing a translucent object, the character detection method comprising:
   a first step for calculating, for each of blocks obtained by dividing an overlapping region in which the first image is overlapped by the second image, a frequency of appearance of pixels for each of gradations of a property;
   a second step for determining which gradation is the one corresponding to the second image based on the frequency for each of the gradations and generating a replacement image by replacing a pixel having the determined gradation with a pixel having the gradation of the character; and
   a third step for detecting the character from the overlapping region based on the replacement image.

6. The character detection method according to claim 5, comprising:
   a fourth step, in a case where a first frequency, a second frequency and a third frequency of the frequencies are peaks, the first frequency being a frequency for a first gradation of the gradations, the second frequency being a frequency for a second gradation of the gradations and the third frequency being a frequency for a third gradation of the gradations, and where a difference between the third frequencies of any two of the blocks is smaller than a difference between the first frequencies of said two of the blocks and a difference between the second frequencies of said two the blocks, for generating a first replacement image by replacing a third pixel having the third gradation of the overlapping region with a first pixel having the first gradation of the overlapping region, and for generating a second replacement image by replacing the third pixel with a second pixel having the second gradation of the overlapping region;
   a fifth step for performing closing on the second pixel in the first replacement image; and a sixth step for performing closing on the first pixel in the second replacement image,
wherein the third step includes detecting, as the character, a set of pixels that are located at positions corresponding to positions of the first pixel in the closing processed first replacement image or at positions corresponding to positions of the second pixel in the closing processed second replacement image, from the overlapping region.

7. The character detection method according to claim 5, wherein in a case where the second image is a color image, the property is color lightness.

8. The character detection method according to claim 5, wherein in a case where the first image and the second image are monochrome images, the property is density.

9. A non-transitory computer-readable storage medium storing thereon a computer program used in a computer for detecting the character, from an image in which a first image representing the character is overlapped by a second image representing a translucent object, the computer program causing the computer to implement processes comprising:
  first processing for calculating, for each of blocks obtained by dividing an overlapping region in which the first image is overlapped by the second image, a frequency of appearance of pixels for each of gradations of a property;
  second processing for determining which gradation is the one corresponding to the second image based on the frequency for each of the gradations and generating a replacement image by replacing a pixel having the determined gradation with a pixel having the gradation of the character; and
  third processing for detecting the character from the overlapping region based on the replacement image.

10. The non-transitory computer-readable storage medium according to claim 9, the computer program causing the computer to implement processes comprising:
  fourth processing, in a case where a first frequency, a second frequency and a third frequency of the frequencies are peaks, the first frequency being a frequency for a first gradation of the gradations, the second frequency being a frequency for a second gradation of the gradations and the third frequency being a frequency for a third gradation of the gradations, and where a difference between the third frequencies of any two of the blocks is smaller than a difference between the first frequencies of said two of the blocks and a difference between the second frequencies of said two the blocks, for generating a first replacement image by replacing a third pixel having the third gradation of the overlapping region with a first pixel having the first gradation of the overlapping region, and for generating a second replacement image by replacing the third pixel with a second pixel having the second gradation of the overlapping region;
  fifth processing for performing closing on the second pixel in the first replacement image; and
  sixth processing for performing closing on the first pixel in the second replacement image,
wherein the third processing includes detecting, as the character, a set of pixels that are located at positions corresponding to positions of the first pixel in the closing processed first replacement image or at positions corresponding to positions of the second pixel in the closing processed second replacement image, from the overlapping region.

11. The non-transitory computer-readable storage medium according to claim 9, wherein in a case where the second image is a color image, the property is color lightness.

12. The non-transitory computer-readable storage medium according to claim 9, wherein in a case where the first image and the second image are monochrome images, the property is density.

* * * * *